United States Patent
Liu et al.

(10) Patent No.: US 10,651,966 B2
(45) Date of Patent: May 12, 2020

(54) SIGNAL SENDING METHOD, DEVICE, AND SYSTEM

(71) Applicant: Huawei Technologies Co., Ltd., Shenzhen, Guangdong (CN)

(72) Inventors: Kunpeng Liu, Beijing (CN); Qiang Li, Beijing (CN)

(73) Assignee: Huawei Technologies Co., Inc., Shenzhen (CN)

( * ) Notice: Subject to any disclaimer, the term of this patent is extended or adjusted under 35 U.S.C. 154(b) by 0 days.

(21) Appl. No.: 15/966,428

(22) Filed: Apr. 30, 2018

(65) Prior Publication Data

US 2018/0248649 A1 Aug. 30, 2018

Related U.S. Application Data

(63) Continuation of application No. PCT/CN2015/093287, filed on Oct. 30, 2015.

(51) Int. Cl.
*H04L 1/00* (2006.01)
*H04L 27/26* (2006.01)
(Continued)

(52) U.S. Cl.
CPC ............ *H04L 1/0003* (2013.01); *H04J 11/00* (2013.01); *H04L 5/0044* (2013.01); *H04L 5/0053* (2013.01); *H04L 27/26* (2013.01); *H04L 27/2602* (2013.01); *H04L 27/2636* (2013.01); *H04W 88/181* (2013.01); *H04J 2011/0003* (2013.01)

(58) Field of Classification Search
None
See application file for complete search history.

(56) References Cited

U.S. PATENT DOCUMENTS 6,151,310 A * 11/2000 Dent .................. H01Q 1/246
370/330
6,385,462 B1 * 5/2002 Baum ................ H04L 1/0015
455/522

(Continued)

FOREIGN PATENT DOCUMENTS

CN 101860510 A 10/2010
CN 104202288 A 12/2014
(Continued)

OTHER PUBLICATIONS

Nortel, "Comparison of DFTS-OFDMA with OFDMA", 3GPP TSG-RAN WG1#55, Nov. 10-14, 2008, 11 pages, R1-084475.

*Primary Examiner* — Kevin D Mew
(74) *Attorney, Agent, or Firm* — Rimon PC

(57) ABSTRACT

Embodiments of the present application provide a signal sending method, a device, and a system. A base station modulates, by using a first modulation scheme, signaling carried in a control channel, and modulates, by using a second modulation scheme, data carried in a traffic channel; and the base station sends, to UE, a signal obtained after modulation. In this way, the base station can independently select a modulation scheme for the control channel and the traffic channel, avoiding a case in which a modulation scheme used by the control channel and a modulation scheme used by the traffic channel must be the same, so that the base station can flexibly select a channel modulation scheme.

16 Claims, 8 Drawing Sheets

(51) Int. Cl.
*H04L 5/00* (2006.01)
*H04J 11/00* (2006.01)
*H04W 88/18* (2009.01)

(56) References Cited

U.S. PATENT DOCUMENTS

| | | | |
|---|---|---|---|
| 7,394,864 B2 | 7/2008 | Webster et al. | |
| 8,358,668 B2 | 1/2013 | Zhang et al. | |
| 8,909,137 B2* | 12/2014 | Heo | H04L 1/0004 455/130 |
| 9,408,088 B2* | 8/2016 | Shiizaki | H04L 1/0028 |
| 9,496,999 B2* | 11/2016 | Ji | H04W 72/1263 |
| 2003/0058952 A1 | 3/2003 | Webster et al. | |
| 2005/0164645 A1* | 7/2005 | Li | H04L 1/0003 455/69 |
| 2007/0032246 A1* | 2/2007 | Feher | H04L 27/2071 455/456.1 |
| 2007/0147485 A1* | 6/2007 | Sakamoto | H04L 1/0003 375/219 |
| 2008/0212506 A1* | 9/2008 | Lee | H04W 72/042 370/310 |
| 2008/0242337 A1* | 10/2008 | Sampath | H04W 52/16 455/522 |
| 2009/0016459 A1* | 1/2009 | Kim | H04L 1/001 375/262 |
| 2009/0103483 A1* | 4/2009 | Higuchi | H04L 5/0005 370/329 |
| 2009/0170522 A1* | 7/2009 | Tirkkonen | H04L 5/0092 455/452.1 |
| 2009/0232062 A1* | 9/2009 | Higuchi | H04L 5/0053 370/329 |
| 2010/0103901 A1* | 4/2010 | Miki | H04L 1/0003 370/330 |
| 2011/0038327 A1* | 2/2011 | Moon | H04L 1/004 370/329 |
| 2012/0082130 A1* | 4/2012 | Xue | H04L 5/001 370/330 |
| 2012/0263140 A1 | 10/2012 | Nishio et al. | |
| 2013/0182646 A1* | 7/2013 | Shiizaki | H04L 1/0028 370/328 |
| 2013/0279424 A1* | 10/2013 | Lee | H04L 27/2602 370/328 |
| 2014/0293946 A1* | 10/2014 | Suzuki | H04W 48/12 370/329 |
| 2015/0181587 A1* | 6/2015 | Yang | H04W 72/042 370/329 |
| 2015/0201404 A1* | 7/2015 | Han | H04W 72/042 370/329 |
| 2016/0044678 A1* | 2/2016 | Kwon | H04W 76/14 370/329 |
| 2017/0257250 A1 | 9/2017 | He et al. | |
| 2019/0297617 A1* | 9/2019 | Yamada | H04W 72/0406 |

FOREIGN PATENT DOCUMENTS

| | | |
|---|---|---|
| CN | 104683058 A | 6/2015 |
| CN | 104753846 A | 7/2015 |
| EP | 1775901 A1 | 4/2007 |
| WO | 2010/053985 A2 | 5/2010 |

\* cited by examiner

SIGNAL SENDING METHOD, DEVICE, AND SYSTEM

CROSS-REFERENCE TO RELATED APPLICATIONS

This application is a continuation of International Application No. PCT/CN2015/093287, filed on Oct. 30, 2015, the disclosure of which is hereby incorporated by reference in its entirety.

TECHNICAL FIELD

Embodiments of the present application relate to communications technologies, and in particular, to a signal sending method, a device, and a system.

BACKGROUND

A logical channel in a wireless communications system is mainly classified into a control channel and a traffic channel. The control channel is used to transmit control plane information, and the traffic channel is used to transmit user plane information.

According to the prior art, signaling or data carried in all logical channels in the wireless communications system uses a same modulation scheme. For example, for a Long Term Evolution (LTE) communications system, a downlink logical channel uses an orthogonal frequency division multiplexing (OFDM) modulation scheme. For a subframe, the control channel occupies the first to third OFDM symbols of the subframe, and the traffic channel occupies a remaining OFDM symbol in the subframe.

However, in the prior art, there is a problem that a channel modulation scheme is not flexible enough.

SUMMARY

Embodiments of the present application provide a signal sending method, a device, and a system, so as to resolve a problem in the prior art that a channel modulation scheme is not flexible enough.

According to a first aspect, an embodiment of the present application provides a signal sending method, including:

modulating, by a base station by using a first modulation scheme, signaling carried in a control channel, and modulating, by using a second modulation scheme, data carried in a traffic channel; and sending, by the base station, a signal obtained after modulation to a user equipment UE, where the control channel and the traffic channel are multiplexed using time division multiplexing, frequency division multiplexing, or space division multiplexing.

With reference to the first aspect, in a first possible implementation of the first aspect, the control channel is ahead of the traffic channel in terms of time, header information is carried in a start time period of the control channel, and the header information includes at least one of the following information:

the first modulation scheme, the second modulation scheme, a first demodulation scheme, a second demodulation scheme, a quantity of symbols included in the control channel and a quantity of symbols included in the traffic channel, where the first demodulation scheme is a demodulation scheme corresponding to the first modulation scheme, and the second demodulation scheme is a demodulation scheme corresponding to the second modulation scheme.

In this embodiment of the present application, the header information is carried in the start time period of the control channel, so that the UE can obtain, from a start time period of the control channel, at least one of the following information: a modulation scheme of the control channel, a modulation scheme of the traffic channel, the quantity of symbols included in the control channel and the quantity of symbols included in the traffic channel, and the like.

With reference to the first possible implementation of the first aspect, in a second possible implementation of the first aspect, if the UE belongs to a first UE group, the header information further includes group information of the first UE group to which the UE belongs, and the group information is used to indicate a start time of a search section of the first UE group.

In this embodiment of the present application, the header information includes the group information of the first UE group to which the UE belongs, so that the UE can obtain, from the header information, the start time of the search section of the first UE group to which the UE belongs.

With reference to any one of the first aspect, or the first and the second possible implementations of the first aspect, in a third possible implementation of the first aspect, the first modulation scheme is a single-carrier modulation scheme, and the second modulation scheme is an orthogonal frequency division multiplexing OFDM modulation scheme.

In this embodiment of the present application, the first modulation scheme is set to the single-carrier modulation scheme and the second modulation scheme is set to the OFDM modulation scheme, so that a high data transmission rate and coverage of the control channel can be both ensured.

With reference to the third possible implementation of the first aspect, in a fourth possible implementation of the first aspect, the method further includes:

using, by the base station, a multiple access manner of Code Division Multiple Access CDMA or Time Division Multiple Access TDMA for the control channel, so as to distinguish signaling of the UE from signaling of other UE.

With reference to the third or the fourth possible implementation of the first aspect, in a fifth possible implementation of the first aspect, the signaling carried in the control channel includes the signaling of the UE and system message signaling, and the modulating, by a base station by using a first modulation scheme, signaling carried in a control channel includes:

classifying, by the base station, the signaling of the UE and the system message signaling into at least one group, where each group includes at least a part of the signaling of the UE and at least a part of the system message signaling; and performing, by the base station, multiplexing and interleaving on signaling in each group, performing an N+M point discrete Fourier transform DFT on the interleaved signaling, and mapping, to a system resource of K points, M+N points obtained after the DFT transform, and then performing a K point inverse fast Fourier transform IFFT, so as to obtain a single carrier SC symbol corresponding to each group, where M, N, and K are positive integers, and a sum of M and N is less than or equal to K.

With reference to the third or the fourth possible implementation of the first aspect, in a sixth possible implementation of the first aspect, the signaling carried in the control channel includes the signaling of the UE and system message signaling, and the modulating, by a base station by using a first modulation scheme, signaling carried in a control channel includes:

classifying, by the base station, the signaling of the UE and the system message signaling into two groups, wherein the two groups, one group A includes the signaling of the UE, and the other group B includes the system message signaling, for the group A, the base station performs an N point DFT on signaling in the group A, and for the group B, the base station performs an M point DFT on signaling in the group B; and mapping, by the base station to a system resource of K points, M+N points obtained after the DFT transform performed on the group A and the DFT transform performed on the group B, and then performing a K point IFFT, so as to obtain an SC symbol corresponding to the group A and an SC symbol corresponding to the group B, where M, N, and K are positive integers, and a sum of M and N is less than or equal to K.

With reference to any one of the first aspect, or the first to the sixth possible implementations of the first aspect, in a seventh possible implementation of the first aspect, when the control channel and the traffic channel are multiplexed using time division multiplexing, a time guard interval is set between the control channel and the traffic channel.

In this embodiment of the present application, the time guard interval is set between the control channel and the traffic channel, so that the UE can determine an end time of the control channel and a start time of the traffic channel when the time guard interval is detected.

According to a second aspect, an embodiment of the present application provides a signal sending method, including:

determining, by a user equipment UE, a first demodulation scheme and a second demodulation scheme;

receiving, by the UE, a signal from a base station; and demodulating, by the UE, the signal by using the first demodulation scheme and the second demodulation scheme, so as to obtain signaling carried in a control channel and data carried in a traffic channel, where the control channel and the traffic channel are multiplexed using time division multiplexing, frequency division multiplexing, or space division multiplexing.

With reference to the second aspect, in a first possible implementation of the second aspect, the control channel is ahead of the traffic channel in terms of time, header information is carried in a start time period of the control channel, and the header information includes at least one of the following information:

the first modulation scheme, the second modulation scheme, the first demodulation scheme, the second demodulation scheme, a quantity of symbols included in the control channel and a quantity of symbols included in the traffic channel, where the first demodulation scheme is a demodulation scheme corresponding to the first modulation scheme, and the second demodulation scheme is a demodulation scheme corresponding to the second modulation scheme.

With reference to the first possible implementation of the second aspect, in a second possible implementation of the second aspect, if the UE belongs to a first UE group, the header information further includes group information of the first UE group to which the UE belongs, and the group information is used to indicate a start time of a search section of the first UE group.

With reference to any one of the second aspect, or the first and the second possible implementations of the second aspect, in a third possible implementation of the second aspect, the first modulation scheme is a single-carrier modulation scheme, and the second modulation scheme is an orthogonal frequency division multiplexing OFDM modulation scheme.

With reference to the third possible implementation of the second aspect, in a fourth possible implementation of the second aspect, before the demodulating, by the UE, the signal by using the first demodulation scheme and the second demodulation scheme, the method further includes:

using, by the UE, a multiple access manner of Code Division Multiple Access CDMA or Time Division Multiple Access TDMA, so as to obtain, from the signal, a signal that belongs to the UE; and the demodulating, by the UE, the signal by using the first demodulation scheme and the second demodulation scheme includes:

demodulating, by the UE, the signal of the UE by using the first demodulation scheme and the second demodulation scheme.

With reference to any one of the second aspect, or the first to the fourth possible implementations of the second aspect, in a fifth possible implementation of the second aspect, when the control channel and the traffic channel are multiplexed using time division multiplexing, a time guard interval is set between the control channel and the traffic channel.

According to a third aspect, an embodiment of the present application provides a base station, including:

a processing module, configured to: modulate, by using a first modulation scheme, signaling carried in a control channel, and modulate, by using a second modulation scheme, data carried in a traffic channel; and a sending module, configured to send a signal obtained after modulation to a user equipment UE, where the control channel and the traffic channel are multiplexed using time division multiplexing, frequency division multiplexing, or space division multiplexing.

With reference to the third aspect, in a first possible implementation of the third aspect, the control channel is ahead of the traffic channel in terms of time, header information is carried in a start time period of the control channel, and the header information includes at least one of the following information:

the first modulation scheme, the second modulation scheme, a first demodulation scheme, a second demodulation scheme, a quantity of symbols included in the control channel and a quantity of symbols included in the traffic channel, where the first demodulation scheme is a demodulation scheme corresponding to the first modulation scheme, and the second demodulation scheme is a demodulation scheme corresponding to the second modulation scheme.

With reference to the first possible implementation of the third aspect, in a second possible implementation of the third aspect, if the UE belongs to a first UE group, the header information further includes group information of the first UE group to which the UE belongs, and the group information is used to indicate a start time of a search section of the first UE group.

With reference to any one of the third aspect, or the first and the second possible implementations of the third aspect, in a third possible implementation of the third aspect, the first modulation scheme is a single-carrier modulation scheme, and the second modulation scheme is an orthogonal frequency division multiplexing OFDM modulation scheme.

With reference to the third possible implementation of the third aspect, in a fourth possible implementation of the third aspect, the processing module is further configured to use a multiple access manner of Code Division Multiple Access CDMA or Time Division Multiple Access TDMA for the control channel, so as to distinguish signaling of the UE from signaling of other UE.

With reference to the third or the fourth possible implementation of the third aspect, in a fifth possible implementation of the third aspect, the signaling carried in the control channel includes the signaling of the UE and system message signaling, and that the processing module modulates, by using the first modulation scheme, the signaling carried in the control channel specifically includes:

classifying the signaling of the UE and the system message signaling into at least one group, where each group includes at least a part of the signaling of the UE and at least a part of the system message signaling; and performing multiplexing and interleaving on signaling in each group, performing an N+M point discrete Fourier transform DFT on the interleaved signaling, and mapping, to a system resource of K points, M+N points obtained after the DFT transform, and then performing a K point inverse fast Fourier transform IFFT, so as to obtain a single carrier SC symbol corresponding to each group, where M, N, and K are positive integers, and a sum of M and N is less than or equal to K.

With reference to the third or the fourth possible implementation of the third aspect, in a sixth possible implementation of the third aspect, the signaling carried in the control channel includes the signaling of the UE and system message signaling, and that the processing module modulates, by using the first modulation scheme, the signaling carried in the control channel specifically includes:

classifying the signaling of the UE and the system message signaling into two groups, where in the two groups, one group A includes the signaling of the UE, and the other group B includes the system message signaling, for the group A, an N point DFT is performed on signaling in the group A, and for the group B, an M point DFT is performed on signaling in the group B; and mapping, to a system resource of K points, M+N points obtained after the DFT transform performed on the group A and the DFT transform performed on the group B, and then performing a K point IFFT, so as to obtain an SC symbol corresponding to the group A and an SC symbol corresponding to the group B, where M, N, and K are positive integers, and a sum of M and N is less than or equal to K.

With reference to any one of the third aspect, or the first to the sixth possible implementations of the third aspect, in a seventh possible implementation of the third aspect, when the control channel and the traffic channel are multiplexed using time division multiplexing, a time guard interval is set between the control channel and the traffic channel.

According to a fourth aspect, an embodiment of the present application provides a user equipment UE, including:

a receiving module, configured to receive a signal from a base station, where the signal is obtained after the base station modulates, by using a first modulation scheme, signaling carried in a control channel and modulates, by using a second modulation scheme, data carried in a traffic channel; and a processing module, configured to demodulate the signal by using a first demodulation scheme and a second demodulation scheme, so as to obtain the signaling carried in the control channel and the data carried in the traffic channel, where the control channel and the traffic channel are multiplexed using time division multiplexing, frequency division multiplexing, or space division multiplexing, the first demodulation scheme is a demodulation scheme corresponding to the first modulation scheme, and the second demodulation scheme is a demodulation scheme corresponding to the second modulation scheme.

With reference to the fourth aspect, in a first possible implementation of the fourth aspect, the control channel is ahead of the traffic channel in terms of time, header information is carried in a start time period of the control channel, and the header information includes at least one of the following information:

the first modulation scheme, the second modulation scheme, the first demodulation scheme, the second demodulation scheme, a quantity of symbols included in the control channel and a quantity of symbols included in the traffic channel, where the first demodulation scheme is the demodulation scheme corresponding to the first modulation scheme, and the second demodulation scheme is the demodulation scheme corresponding to the second modulation scheme.

With reference to the first possible implementation of the fourth aspect, in a second possible implementation of the fourth aspect, if the UE belongs to a first UE group, the header information further includes group information of the first UE group to which the UE belongs, and the group information is used to indicate a start time of a search section of the first UE group.

With reference to any one of the fourth aspect, or the first and the second possible implementations of the fourth aspect, in a third possible implementation of the fourth aspect, the first modulation scheme is a single-carrier modulation scheme, and the second modulation scheme is an orthogonal frequency division multiplexing OFDM modulation scheme.

With reference to the third possible implementation of the fourth aspect, in a fourth possible implementation of the fourth aspect, the processing module is further configured to use a multiple access manner of Code Division Multiple Access CDMA or Time Division Multiple Access TDMA, so as to obtain, from the signal, a signal that belongs to the UE; and that the processing module demodulates the signal by using the first demodulation scheme and the second demodulation scheme specifically includes: demodulating the signal of the UE by using the first demodulation scheme and the second demodulation scheme.

With reference to any one of the fourth aspect, or the first to the fourth possible implementations of the fourth aspect, in a fifth possible implementation of the fourth aspect, when the control channel and the traffic channel are multiplexed using time division multiplexing, a time guard interval is set between the control channel and the traffic channel.

According to a fifth aspect, an embodiment of the present application provides a system, including the base station according to any one of the third aspect, or the first to the seventh possible implementations of the third aspect and the user equipment UE according to any one of the fourth aspect, or the first to the fifth possible implementations of the fourth aspect.

The embodiments of the present application provide the signal sending method, the device, and the system. The base station modulates, by using the first modulation scheme, the signaling carried in the control channel, and modulates, by using the second modulation scheme, the data carried in the traffic channel; and the base station sends, to the UE, the signal obtained after modulation. In this way, the base station can independently select a modulation scheme for the control channel and the traffic channel, avoiding a case in which a modulation scheme used by the control channel and a modulation scheme used by the traffic channel must be the same, so that the base station can flexibly select a channel modulation scheme.

BRIEF DESCRIPTION OF DRAWINGS

To describe the technical solutions in the embodiments of the present application. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

Figure 1A:
FIG. 1A is a schematic diagram of an application scenario according to the present application.

FIG. 1A is a schematic diagram of an application scenario according to the present application. As shown in FIG. 1A, the application scenario according to the present application may include a base station and UE. When sending data to the user equipment (UE), the base station needs to add to-be-sent data to a corresponding logical channel (the logical channel may be classified into two categories: one category is a control channel and the other category is a traffic channel), obtain a signal after performing modulation on signaling or data carried in the logical channel, and send the obtained signal to the UE. After receiving the signal sent by the base station, the UE demodulates the signal by using a demodulation scheme that is corresponding to the modulation performed by the base station, and obtains, from the logical channel, the data carried in the logical channel.

In the prior art, when performing modulation for the logical channel, the base station uses a same modulation scheme for all logical channels, for example, uses an OFDM modulation scheme or a CDMA modulation scheme, and does not distinguish between the control channel and the traffic channel. For example, to improve a data service rate of a user, the traffic channel needs to use the OFDM modulation scheme. In this case, the control channel also needs to use the OFDM modulation scheme, and no other modulation scheme can be selected for the control channel. For another example, to improve accuracy of receiving control signaling by the UE, the control channel needs to use the CDMA modulation scheme. In this case, the traffic channel also needs to use the CDMA modulation scheme, and no other modulation scheme can be selected for the traffic channel. Therefore, in the prior art, there is a problem that a channel modulation scheme is not flexible enough.

Figure 1B:
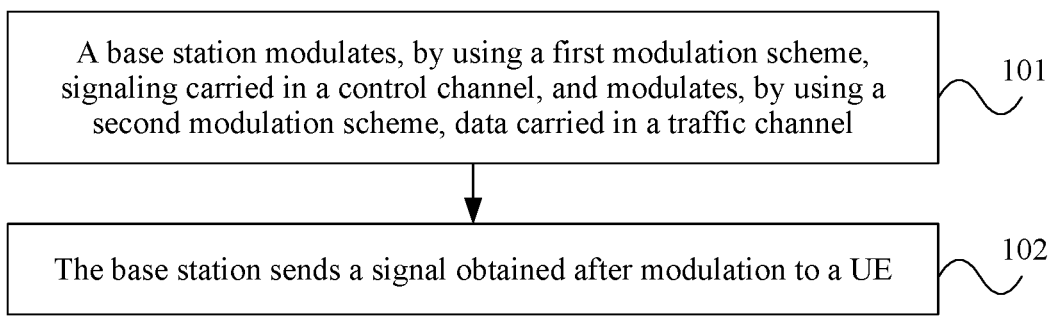
FIG. 1B is a flowchart of Embodiment 1 of a signal sending method according to the present application.

FIG. 1B is a flowchart of Embodiment 1 of a signal sending method according to the present application. As shown in FIG. 1B, the method in this embodiment may include the following steps.

Step 101. A base station modulates, by using a first modulation scheme, signaling carried in a control channel, and modulates, by using a second modulation scheme, data carried in a traffic channel.

The control channel and the traffic channel are multiplexed using time division multiplexing, frequency division multiplexing, or space division multiplexing.

It should be noted that the modulation in the present application refers to a process of processing information (for example, signaling or data) and loading the information onto a carrier, so that the information becomes a form that is suitable for channel transmission. For example, quadrature phase shift keying QPSK) modulation, OFDM modulation, and Gaussian minimum frequency shift keying (GMSK, Gaussian Filtered Minimum Shift Keying).

Step 102. The base station sends, to UE, a signal obtained after modulation.

In this embodiment, the base station modulates, by using the first modulation scheme, the signaling carried in the control channel, and modulates, by using the second modulation scheme, the data carried in the traffic channel; and the base station sends, to the UE, the signal obtained after modulation. In this way, the base station can independently select a modulation scheme for the control channel and the traffic channel, avoiding a case in which a modulation scheme used by the control channel and a modulation scheme used by the traffic channel must be the same, so that the base station can flexibly select a channel modulation scheme.

Figure 2:
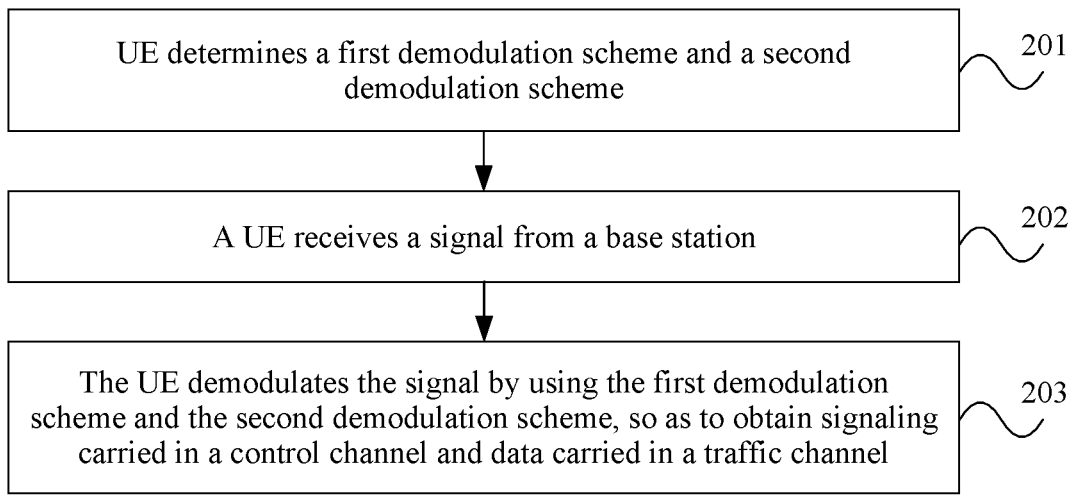
FIG. 2 is a flowchart of Embodiment 2 of a signal sending method according to the present application.

FIG. 2 is a flowchart of Embodiment 2 of a signal sending method according to the present application. As shown in FIG. 2, the method in this embodiment may include the following steps:

Step 201. UE determines a first demodulation scheme and a second demodulation scheme.

Step 202. The UE receives a signal from a base station.

Step 203. The UE demodulates the signal by using the first demodulation scheme and the second demodulation scheme, so as to obtain signaling carried in a control channel and data carried in a traffic channel.

The control channel and the traffic channel are multiplexed using time division multiplexing, frequency division multiplexing, or space division multiplexing.

It should be noted that, the first demodulation scheme is a demodulation scheme corresponding to a first modulation scheme, and the second demodulation scheme is a demodulation scheme corresponding to a second modulation scheme.

In this embodiment, the UE demodulates the signal by using the first demodulation scheme and the second demodulation scheme, so as to obtain the signaling carried in the control channel and the data carried in the traffic channel. The control channel and the traffic channel are multiplexed using time division multiplexing, frequency division multiplexing, or space division multiplexing. Therefore, the UE can demodulate the signal obtained after the base station modulates, by using the first modulation scheme, the signaling carried in the control channel, and modulates, by using the second modulation scheme, the data carried in the traffic channel, so as to obtain the signaling carried in the control channel and the data carried in the traffic channel.

Figure 3:
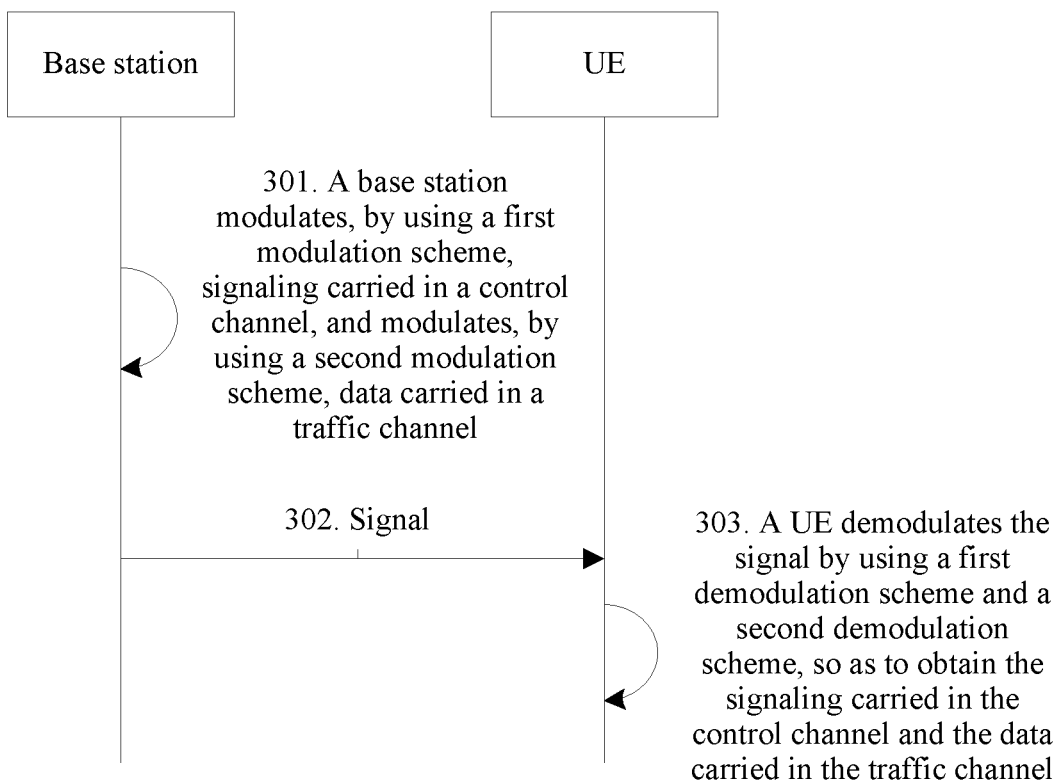
FIG. 3 is a flowchart of Embodiment 3 of a signal sending method according to the present application.

FIG. 3 is a flowchart of Embodiment 3 of a signal sending method according to the present application. As shown in FIG. 3, the method in this embodiment may include the following steps.

Step 301. A base station modulates, by using a first modulation scheme, signaling carried in a control channel, and modulates, by using a second modulation scheme, data carried in a traffic channel.

The control channel and the traffic channel are multiplexed using time division multiplexing, frequency division multiplexing, or space division multiplexing.

Optionally, the first modulation scheme may be a single-carrier (SC) modulation scheme, and the second modulation scheme may be an OFDM modulation scheme.

Figure 4:
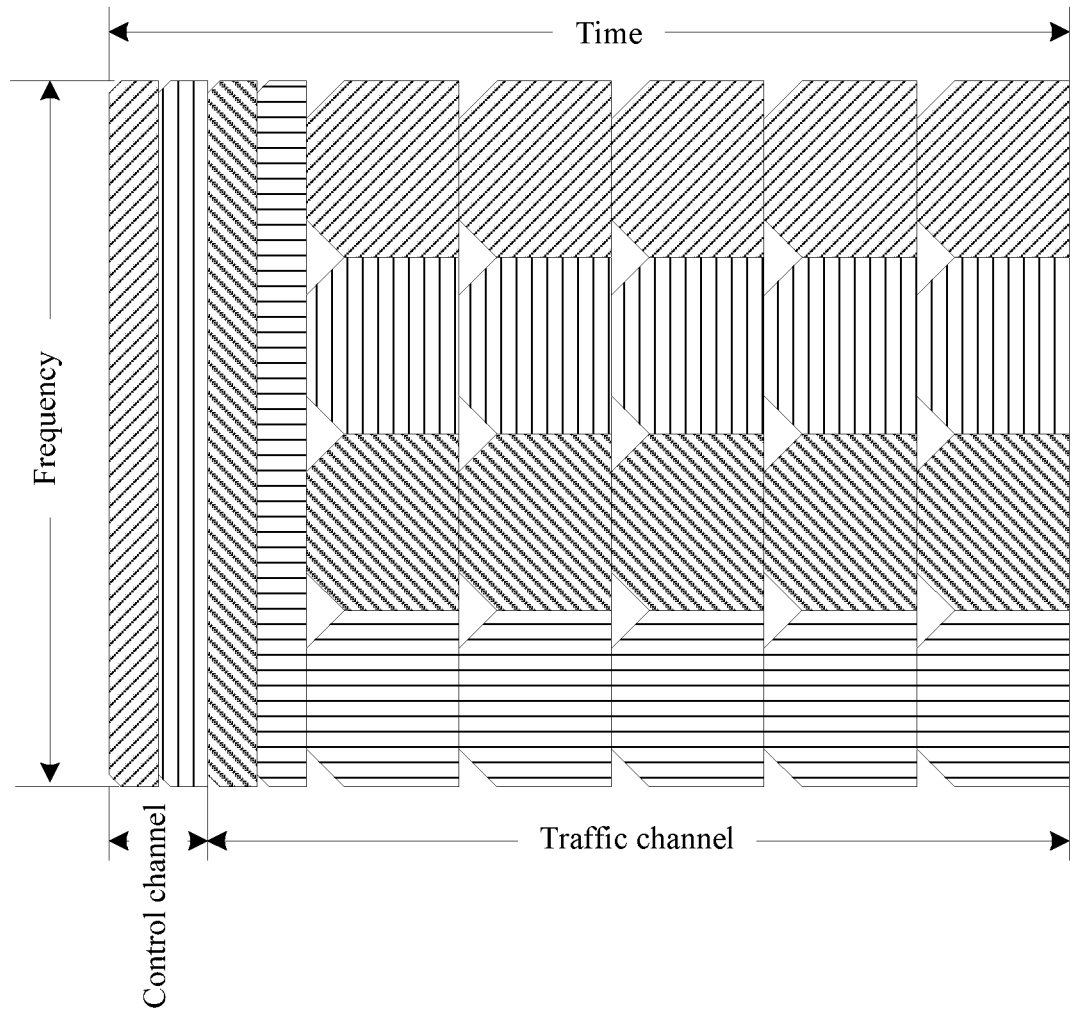
FIG. 4 is a schematic diagram of a modulated signal according to an embodiment of the present application.

For example, FIG. 4 is a schematic diagram of a modulated signal according to an embodiment of the present application. In FIG. 4, an example in which the control channel and the traffic channel are multiplexed using time division multiplexing, the first modulation scheme is the SC modulation scheme, and the second modulation scheme is the OFDM modulation scheme is used for description. As shown in FIG. 4, the control channel and the traffic channel are multiplexed using time division multiplexing within a same frequency range of a communications system. The control channel and the traffic channel that are filled with a same filling pattern carry data of same UE. For example, in FIG. 4, a part that is filled with left oblique lines in the control channel and a part that is filled with left oblique lines in the traffic channel carry data of same UE.

Optionally, a length of "time" in FIG. 4 may be any value, for example, may be a time length of one subframe.

Optionally, the control channel includes at least one of the following channels:

a broadcast control channel, a paging control channel, a common control channel, and a dedicated control channel.

In an existing LTE system, the OFDM modulation scheme is uniformly used in a downlink direction. Using the OFDM modulation scheme causes a high peak to average power ratio (PAPR), and relatively large power back-off. Therefore, there is a problem of coverage limitation for the control channel. According to the technical solution provided in this embodiment in FIG. 4, the signaling in the control channel and the data in the traffic channel are modulated by using different modulation schemes, so that a high data transmission rate and coverage of the control channel can be both ensured.

It should be noted that, to meet another requirement, an appropriate modulation scheme may be separately set for the control channel and the traffic channel according to a requirement. For example, when a case in which a signaling transmission rate of the control channel is relatively high and coverage of the traffic channel is relatively large needs to be met, the OFDM modulation scheme may be used for the control channel, and the single-carrier modulation scheme may be used for the traffic channel.

Optionally, the control channel is ahead of the traffic channel in terms of time, header information is carried in a start time period of the control channel, and the header information includes at least one of the following information:

the first modulation scheme, the second modulation scheme, a first demodulation scheme, a second demodulation scheme, a quantity of symbols included in the control channel and a quantity of symbols included in the traffic channel.

The first demodulation scheme is a demodulation scheme corresponding to the first modulation scheme, and the second demodulation scheme is a demodulation scheme corresponding to the second modulation scheme.

For example, the header information may include: the quantity of symbols of the control channel is N, the quantity of symbols of the traffic channel is M, and a modulation scheme of the traffic channel is OFDM modulation, where M and N are positive integers.

Optionally, in FIG. 4, a sampling period of the control channel may be Ts1 (the Ts1 is a positive number), a quantity of sampling points of each SC symbol is Nsc (the Nsc is a positive integer), and a pilot occupies N_pilot (the N_pilot is a positive integer) sampling points. Duration of each SC symbol is T_sc (the T_sc is a positive number), and each symbol carries a control channel element (CCE) of one physical downlink control channel (PDCCH). A sampling period of the traffic channel may be Ts2 (the Ts2 is a positive number), and a quantity of sampling points of each OFDM symbol is Nofdm (the Nofdm is a positive integer). Duration of an entire symbol is T_ofdm (the T_ofdm is a positive number), and the OFDM symbol carries data.

Optionally, when the control channel and the traffic channel are multiplexed using time division multiplexing, a time guard interval may be set between the control channel and the traffic channel.

Optionally, the base station may not send any information in the time guard interval, or may send a specific sequence within the time guard interval.

Optionally, when the time guard interval is set between the control channel and the traffic channel, the UE may determine an end time of the control channel and a start time of the traffic channel when the time guard interval is detected.

Optionally, when the control channel carries the header information, the UE may determine the start time of the traffic channel by using the quantity of symbols of the control channel in the header information.

Optionally, in this embodiment, the base station may use a multiple access manner of Code Division Multiple Access (CDMA) or Time Division Multiple Access (TDMA) for the control channel.

It should be noted that, the multiple access in the present application means that differences in signal characteristics (for example, a signal sending frequency, a signal emergence time, or a specific waveform of a signal) sent for different UEs are used to distinguish different users. For example, Frequency Division Multiple Access (FDMA), TDMA, CDMA, and Space Division Multiple Access (SDMA).

Optionally, the header information may further include group information of a first UE group to which the UE belongs, and the group information is used to indicate a start time of a search section of the first UE group.

Figure 5:
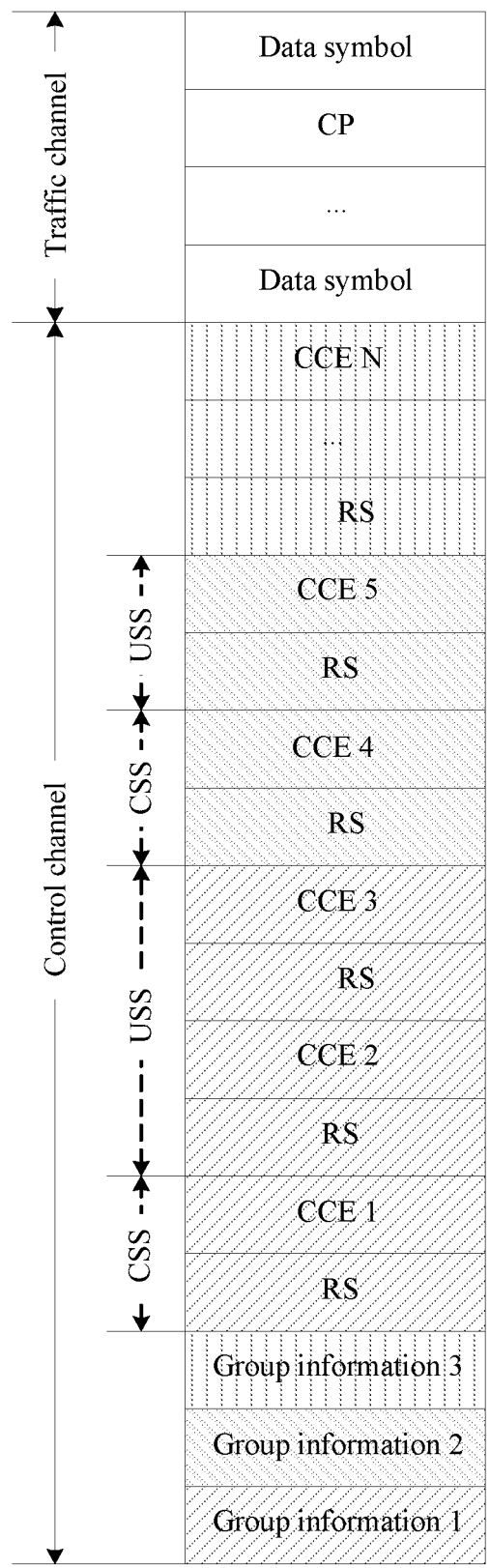
FIG. 5 is a schematic diagram of a search section according to an embodiment of the present application.

FIG. 5 is a schematic diagram of a search section according to an embodiment of the present application. In FIG. 5, an example in which the control channel uses the single-carrier modulation scheme, and various UEs are classified into three UE groups is used for description. Each group has a search section corresponding to each group. The search section is classified into a communal search section and a user specific search section. UE may detect the broadcast control channel, the paging control channel, and the common control channel in the communal search section, and the UE may detect the dedicated control channel in the user specific search section. UE in each group uses a common pilot of the group, a start point of a search section corresponding to each group is determined by using group information corresponding to the group, and a search start point of each UE in the group may be determined by a user identifier.

As shown in FIG. 5, the group information of the UE is carried in the start time period of the control channel, the group information may be scrambled by using a beam identifier (beam ID), the group information may notify a start time of a search section of one UE group corresponding to the group information, and the search section of each group is continuous in terms of time. In the search section of each group, the communal search section (CSS) precedes the user specific search section (USS), and a reference signal (RS) is first sent at the beginning of the CSS. Group information of different groups may be sent by using different beams, and aggregation levels of different UEs may be different, that is, quantities of symbols of UEs may be different. FIG. 5 includes three groups in total: a group 1 represented by left oblique lines, a group 2 represented by right oblique lines, and a group 3 represented by vertical lines.

In FIG. 5, control channels in different groups use the multiple access manner of TDMA, and a control channel in a same group also uses the multiple access manner of TDMA.

It should be noted that, the header information may not include the group information, and the UE may directly determine the start time of the search section of the group by using the beam ID.

Figure 6:
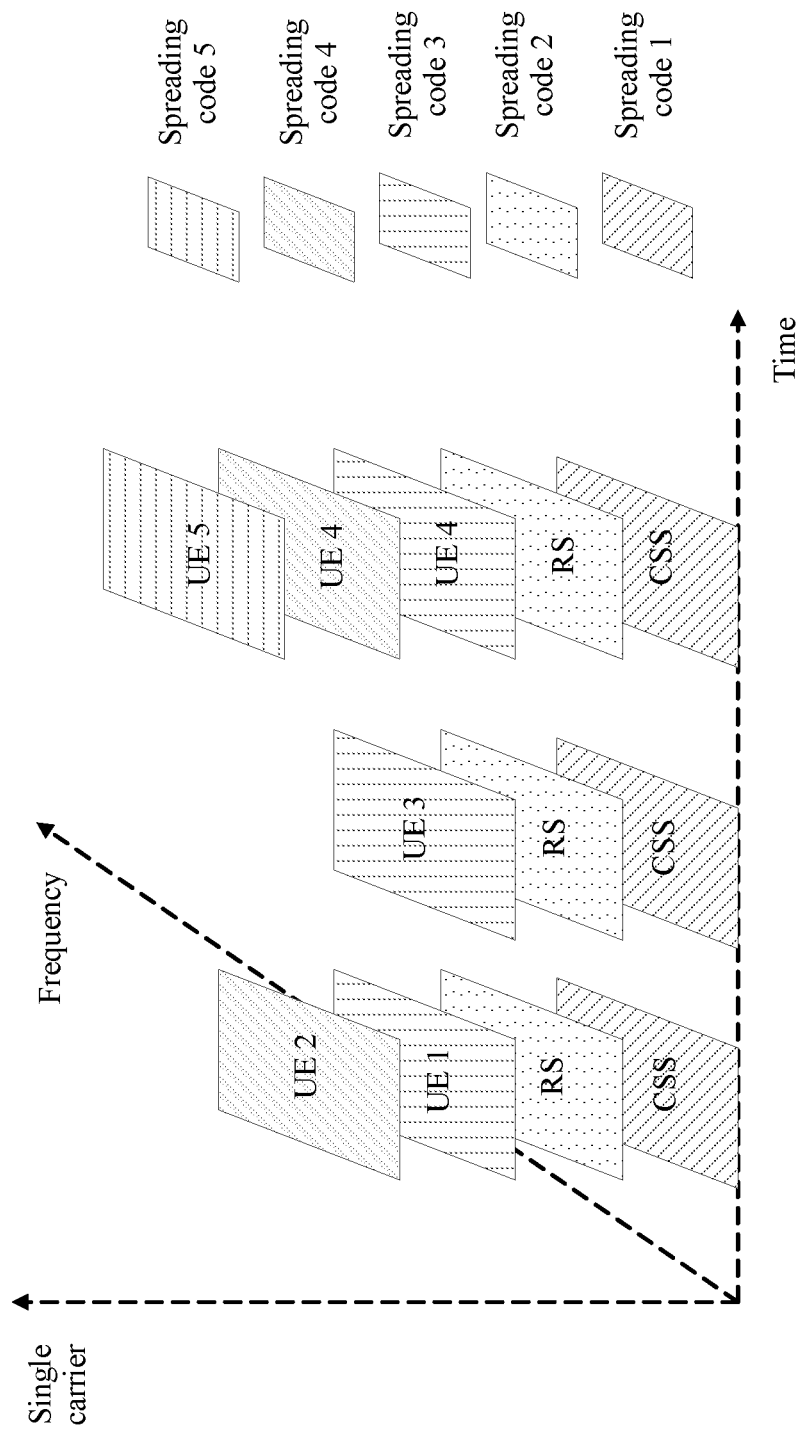
FIG. 6 is a schematic diagram of a control channel according to an embodiment of the present application.

FIG. 6 is a schematic diagram of a control channel according to an embodiment of the present application. In FIG. 6, an example in which the control channel uses the single-carrier modulation scheme, and various UEs are classified into three UE groups is used for description. Different filling patterns in FIG. 6 represent different spreading codes. As shown in FIG. 6, a control channel in a same UE group uses the multiple access manner of CDMA (that is, different UE groups are distinguished by using different spreading codes). An inter-group control channel uses the multiple access manner of TDMA, and each user may use one or more spreading codes (for example, UE 4 in FIG. 6 uses a plurality of spreading codes). Each group has one fixed spreading code to be allocated to a CSS and one fixed spreading code to be allocated to an RS.

Optionally, the signaling carried in the control channel includes signaling of the UE and system message signaling, and the modulating, by a base station by using a first modulation scheme, signaling carried in a control channel includes:

classifying, by the base station, the signaling of the UE and the system message signaling into two groups, wherein the two groups, one group A includes the signaling of the UE, and the other group B includes the system message signaling, for the group A, the base station performs an N point DFT on signaling in the group A, and for the group B, the base station performs an M point DFT on signaling in the group B; and mapping, to a system resource of K points, M+N points obtained after the DFT transform performed on the group A and the DFT transform performed on the group B, and then performing a K point IFFT, so as to obtain an SC symbol corresponding to the group A and an SC symbol corresponding to the group B, where M, N, and K are positive integers, and a sum of M and N is less than or equal to K.

Figure 7:
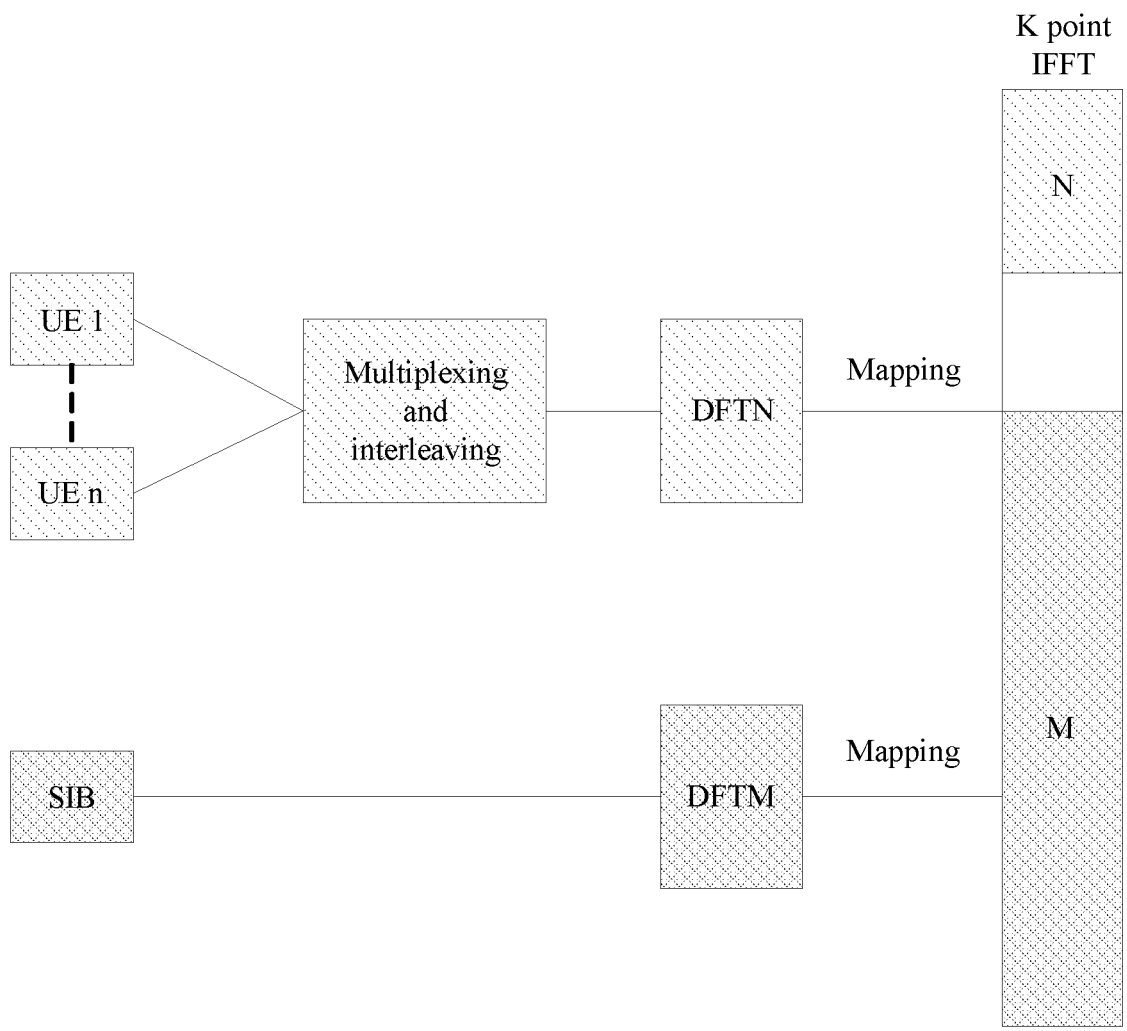
FIG. 7 is a schematic diagram of single-carrier modulation according to an embodiment of the present application.

FIG. 7 is a schematic diagram of single-carrier modulation according to an embodiment of the present application. In FIG. 7, an example in which in a modulation method of a discrete Fourier transform (DFT)-S-OFDM, signaling carried in a control channel needs to include signaling of UE 1 to UE n and system message signaling is used for description. The UE 1 indicates that a control channel needs to carry one group of signaling of first UE, and the UE n indicates that the control channel needs to carry one group of signaling of $n^{th}$ UE. A system information block (SIB) represents one group of the system message signaling that needs to be carried in the control channel. As shown in FIG. 7, a single-carrier modulation method is as follows: In one channel, the base station performs multiplexing and interleaving for the UE 1 to the UE n (the first UE to the $n^{th}$UE belong to a same group), and performs N point DFT on the interleaved data. In another channel, the base station performs M point DFT on the SIB, maps, to the system resource of K points, M+N points that are obtained after the DFT is performed on the two channels, and then performs a K point inverse fast Fourier transform (IFFT), so as to obtain one SC, where M, N, and K are positive integers, and a sum of M and N is less than or equal to K.

Alternatively, the modulating, by a base station by using a first modulation scheme, signaling carried in a control channel includes:

classifying, by the base station, the signaling of the UE and the system message signaling into at least one group, where each group includes at least a part of the signaling of the UE and at least a part of the system message signaling; and performing, by the base station, multiplexing and interleaving on signaling in each group, performing an N+M point discrete Fourier transform DFT on the interleaved signaling, and mapping, to a system resource of K points, M+N points obtained after the DFT transform, and then performing a K point inverse fast Fourier transform IFFT, so as to obtain a single carrier SC symbol corresponding to each group, where M, N, and K are positive integers, and a sum of M and N is less than or equal to K.

Figure 8:
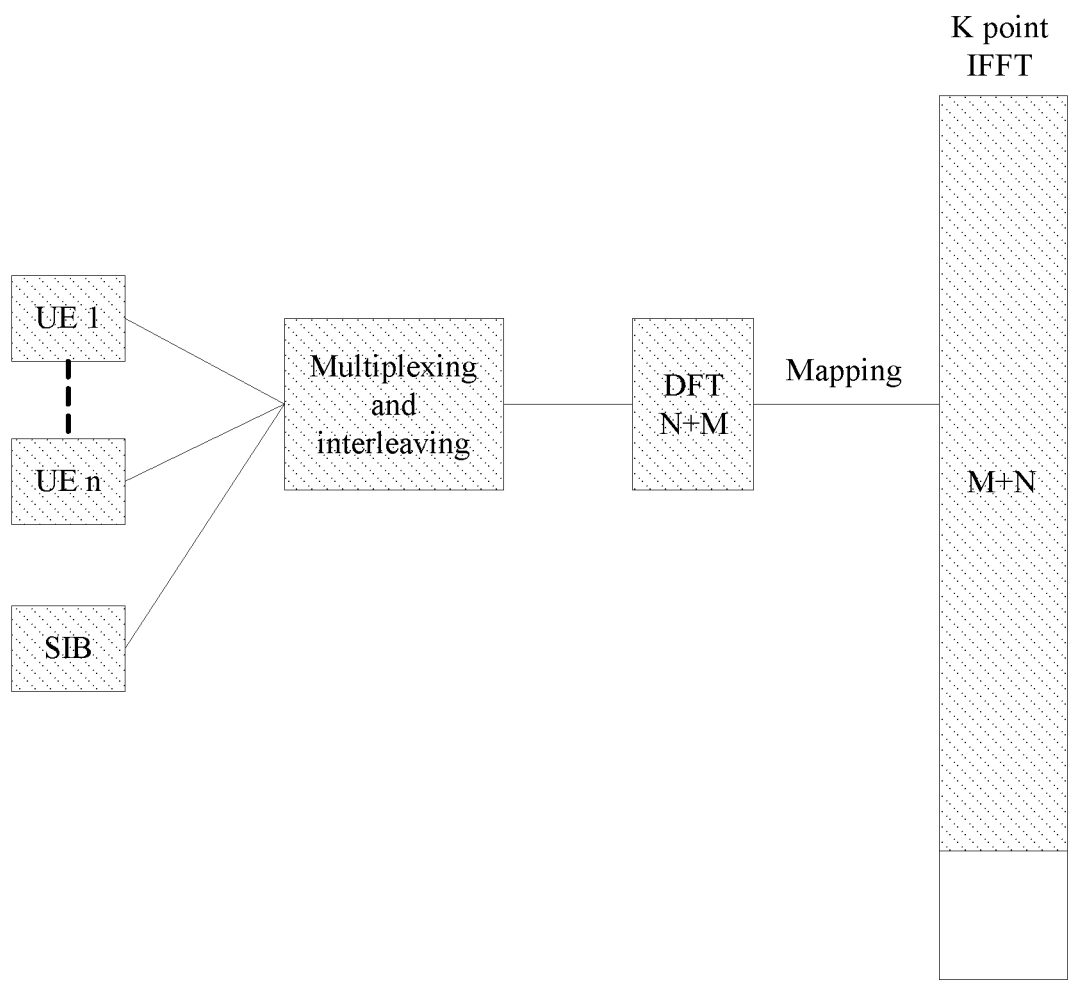
FIG. 8 is a schematic diagram of another single-carrier modulation according to an embodiment of the present application.

FIG. 8 is a schematic diagram of another single-carrier modulation according to an embodiment of the present application. A scenario in FIG. 8 is the same as that in FIG. 7. As shown in FIG. 8, another single-carrier modulation method is as follows: The base station performs multiplexing and interleaving for the UE 1 to the UE n and the SIB uniformly, performs an N+M point DFT on the interleaved signaling, maps, to a system resource of K points, the M+N points obtained after the DFT transform, and then performs a K point IFFT, so as to obtain one SC, where M, N, and K are positive integers, and a sum of M and N is less than or equal to K.

It can be learned that a difference between FIG. 8 and FIG. 7 mainly lies in that in FIG. 8, the base station performs the N+M point DFT jointly on the SIB and the UE 1 to the UE n, and in FIG. 7, the base station performs the DFT separately on the SIB and the UE 1 to the UE n.

Step 302. The base station sends, to UE, a signal obtained after modulation.

Step 303. The UE demodulates the signal by using a first demodulation scheme and a second demodulation scheme, so as to obtain the signaling carried in the control channel and the data carried in the traffic channel.

It should be noted that, before step 303, the method further includes: determining, by the UE, the first demodulation scheme and the second demodulation scheme.

Optionally, the UE may receive a notification message sent by the base station, and determine the first demodulation scheme and the second demodulation scheme according to the notification message.

For example, after the notification message may indicate a current time, the base station modulates, by using the first modulation scheme, the signaling carried in the control channel, and modulates, by using the second modulation scheme, the data carried in the traffic channel.

Alternatively, for another example, after the notification message may indicate a current time, the UE demodulates, by using the first demodulation scheme, the signaling carried in the control channel, and demodulates, by using the second demodulation scheme, the data carried in the traffic channel.

Alternatively, for another example, after the notification message may indicate a current time, the base station modulates, by using the first modulation scheme, the signaling carried in the control channel, and the header information that is carried in the control channel and that is sent by the base station to the UE includes a modulation scheme of the traffic channel (that is, the second modulation scheme).

The first demodulation scheme is a demodulation scheme corresponding to the first modulation scheme, and the second demodulation scheme is a demodulation scheme corresponding to the second modulation scheme.

Optionally, when the base station uses the multiple access manner of CDMA or TDMA for the control channel, before step 303, the method may further include: using, by the UE, the multiple access manner of Code Division Multiple Access CDMA or Time Division Multiple Access TDMA, so as to obtain, from the signal, a signal that belongs to the UE.

Correspondingly, step 303 is specifically that the UE demodulates the signal of the UE by using the first demodulation scheme and the second demodulation scheme.

It should be noted that step 303 corresponds to step 301. After referring to step 301 for specific content of step 303, persons skilled in the art can learn an implementation of step 303, and details are not described herein again.

In this embodiment, the base station modulates, by using the first modulation scheme, the signaling carried in the control channel, and modulates, by using the second modulation scheme, the data carried in the traffic channel; and the base station sends, to the UE, a signal obtained after modulation. The UE demodulates the signal by using the first demodulation scheme and the second demodulation scheme, so as to obtain the signaling carried in the control channel and the data carried in the traffic channel. The first demodulation scheme is the demodulation scheme corresponding to the first modulation scheme, and the second demodulation scheme is the demodulation scheme corresponding to the second modulation scheme, so that the base station can perform flexible modulation for different channels.

Figure 9:
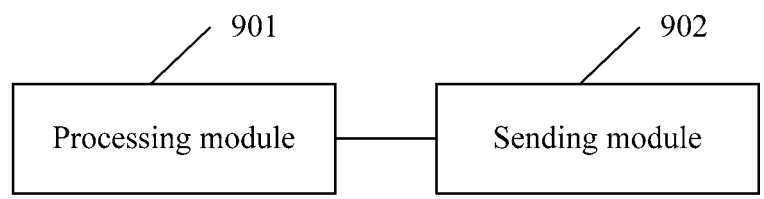
FIG. 9 is a schematic structural diagram of Embodiment 1 of a base station according to the present application.

FIG. 9 is a schematic structural diagram of Embodiment 1 of a base station according to the present application. As shown in FIG. 9, the base station in this embodiment may include a processing module 901 and a sending module 902. The processing module 901 is configured to: modulate, by using a first modulation scheme, signaling carried in a control channel, and modulate, by using a second modulation scheme, data carried in a traffic channel. The sending module 902 is configured to send a signal obtained after modulation to a user equipment UE. The control channel and the traffic channel are multiplexed using time division multiplexing, frequency division multiplexing, or space division multiplexing.

Optionally, the control channel is ahead of the traffic channel in terms of time, header information is carried in a start time period of the control channel, and the header information includes at least one of the following information:

the first modulation scheme, the second modulation scheme, a first demodulation scheme, a second demodulation scheme, a quantity of symbols included in the control channel and a quantity of symbols included in the traffic channel.

The first demodulation scheme is a demodulation scheme corresponding to the first modulation scheme, and the second demodulation scheme is a demodulation scheme corresponding to the second modulation scheme.

Optionally, if the UE belongs to a first UE group, the header information further includes group information of the first UE group to which the UE belongs, and the group information is used to indicate a start time of a search section of the first UE group.

Optionally, the first modulation scheme is a single-carrier modulation scheme, and the second modulation scheme is an orthogonal frequency division multiplexing OFDM modulation scheme.

Optionally, the processing module 901 is further configured to use a multiple access manner of Code Division Multiple Access CDMA or Time Division Multiple Access TDMA for the control channel, so as to distinguish signaling of the UE from signaling of other UE.

Optionally, the signaling carried in the control channel includes the signaling of the UE and system message signaling.

That the processing module 901 modulates, by using the first modulation scheme, the signaling carried in the control channel specifically includes:

classifying the signaling of the UE and the system message signaling into at least one group, where each group includes at least a part of the signaling of the UE and at least a part of the system message signaling; and performing multiplexing and interleaving on signaling in each group, performing an N+M point discrete Fourier transform DFT on the interleaved signaling, and mapping, to a system resource of K points, M+N points obtained after the DFT transform, and then performing a K point inverse fast Fourier transform IFFT, so as to obtain a single carrier SC symbol corresponding to each group, where M, N, and K are positive integers, and a sum of M and N is less than or equal to K.

Alternatively, that the processing module 901 modulates, by using the first modulation scheme, the signaling carried in the control channel specifically includes:

classifying the signaling of the UE and the system message signaling into two groups, where in the two groups, one group A includes the signaling of the UE, and the other group B includes the system message signaling, for the group A, the base station performs an N point DFT on signaling in the group A, and for the group B, the base station performs an M point DFT on signaling in the group B; and mapping, to a system resource of K points, M+N points obtained after the DFT transform performed on the group A and the DFT transform performed on the group B, and then performing a K point IFFT, so as to obtain an SC symbol corresponding to the group A and an SC symbol corresponding to the group B, where M, N, and K are positive integers, and a sum of M and N is less than or equal to K.

Optionally, when the control channel and the traffic channel are multiplexed using time division multiplexing, a time guard interval is set between the control channel and the traffic channel.

The base station in this embodiment may be configured to execute the method embodiment shown in FIG. 1B and the technical solutions on the base station side in the method embodiment shown in FIG. 3. Implementation principles and technical effects thereof are similar, and details are not described herein again.

Figure 10:
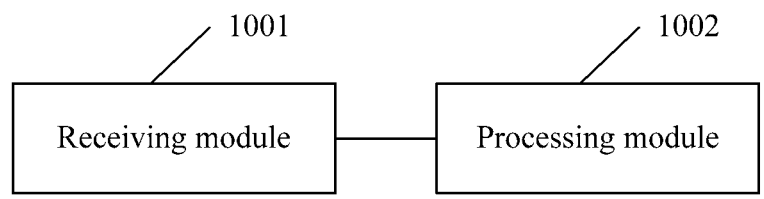
FIG. 10 is a schematic structural diagram of Embodiment 1 of a user equipment according to the present application.

FIG. 10 is a schematic structural diagram of Embodiment 1 of a user equipment according to the present application. As shown in FIG. 10, the user equipment in this embodiment may include a receiving module 1001 and a processing module 1002. The receiving module 1001 is configured to receive a signal from a base station, where the signal is obtained after the base station modulates, by using a first modulation scheme, signaling carried in a control channel and modulates, by using a second modulation scheme, data carried in a traffic channel. The processing module 1002 is configured to demodulate the signal by using a first demodulation scheme and a second demodulation scheme, so as to obtain the signaling carried in the control channel and the data carried in the traffic channel.

The control channel and the traffic channel are multiplexed using time division multiplexing, frequency division multiplexing, or space division multiplexing, the first demodulation scheme is a demodulation scheme corresponding to the first modulation scheme, and the second demodulation scheme is a demodulation scheme corresponding to the second modulation scheme.

Optionally, the control channel is ahead of the traffic channel in terms of time, header information is carried in a start time period of the control channel, and the header information includes at least one of the following information:

the first modulation scheme, the second modulation scheme, the first demodulation scheme, the second demodulation scheme, a quantity of symbols included in the control channel and a quantity of symbols included in the traffic channel.

The first demodulation scheme is the demodulation scheme corresponding to the first modulation scheme, and the second demodulation scheme is the demodulation scheme corresponding to the second modulation scheme.

Optionally, if the UE belongs to a first UE group, the header information further includes group information of the first UE group to which the UE belongs, and the group information is used to indicate a start time of a search section of the first UE group.

Optionally, the first modulation scheme is a single-carrier modulation scheme, and the second modulation scheme is an orthogonal frequency division multiplexing OFDM modulation scheme.

Optionally, the processing module 1002 is further configured to use a multiple access manner of Code Division Multiple Access CDMA or Time Division Multiple Access TDMA, so as to obtain, from the signal, a signal that belongs to the UE.

That the processing module 1002 demodulates the signal by using the first demodulation scheme and the second demodulation scheme specifically includes: demodulating the signal of the UE by using the first demodulation scheme and the second demodulation scheme.

Optionally, when the control channel and the traffic channel are multiplexed using time division multiplexing, a time guard interval is set between the control channel and the traffic channel.

The user equipment in this embodiment may be configured to execute the method embodiment shown in FIG. 2 and the technical solutions on the UE side in the method embodiment shown in FIG. 3. Implementation principles and technical effects thereof are similar, and details are not described herein again.

The present application further provides a system, including the base station according to Embodiment 1 of a base station and the UE according to Embodiment 1 of a user equipment.

The system in this embodiment may be configured to execute the technical solutions in the method embodiment shown in FIG. 3. Implementation principles and technical effects thereof are similar, and details are not described herein again.

Figure 11:
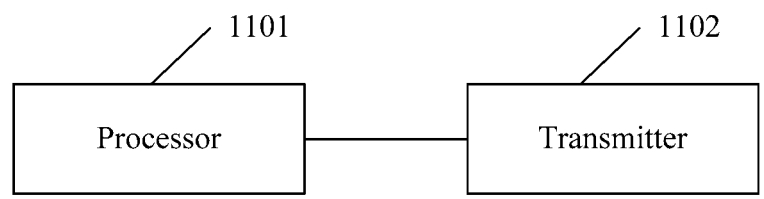
FIG. 11 is a schematic structural diagram of Embodiment 2 of a base station according to the present application.

FIG. 11 is a schematic structural diagram of Embodiment 2 of a base station according to the present application. As shown in FIG. 11, the base station in this embodiment may include a processor 1101 and a transmitter 1102. The processor 1101 is configured to: modulate, by using a first modulation scheme, signaling carried in a control channel, and modulate, by using a second modulation scheme, data carried in a traffic channel. The transmitter 1102 is configured to send a signal obtained after modulation to a user equipment UE. The control channel and the traffic channel are multiplexed using time division multiplexing, frequency division multiplexing, or space division multiplexing.

Optionally, the control channel is ahead of the traffic channel in terms of time, header information is carried in a start time period of the control channel, and the header information includes at least one of the following information:

the first modulation scheme, the second modulation scheme, a first demodulation scheme, a second demodulation scheme, a quantity of symbols included in the control channel and a quantity of symbols included in the traffic channel.

The first demodulation scheme is a demodulation scheme corresponding to the first modulation scheme, and the second demodulation scheme is a demodulation scheme corresponding to the second modulation scheme.

Optionally, if the UE belongs to a first UE group, the header information further includes group information of the first UE group to which the UE belongs, and the group information is used to indicate a start time of a search section of the first UE group.

Optionally, the first modulation scheme is a single-carrier modulation scheme, and the second modulation scheme is an orthogonal frequency division multiplexing OFDM modulation scheme.

Optionally, the processor 1101 is further configured to use a multiple access manner of Code Division Multiple Access CDMA or Time Division Multiple Access TDMA for the control channel, so as to distinguish signaling of the UE from signaling of other UE.

Optionally, the signaling carried in the control channel includes the signaling of the UE and system message signaling.

That the processor 1101 modulates, by using the first modulation scheme, the signaling carried in the control channel specifically includes:

classifying the signaling of the UE and the system message signaling into at least one group, where each group includes at least a part of the signaling of the UE and at least a part of the system message signaling; and performing multiplexing and interleaving on signaling in each group, performing an N+M point discrete Fourier transform. DFT on the interleaved signaling, and mapping, to a system resource of K points, M+N points obtained after the DFT transform, and then performing a K point inverse fast Fourier transform IFFT, so as to obtain a single carrier SC symbol corresponding to each group, where M, N, and K are positive integers, and a sum of M and N is less than or equal to K.

Alternatively, that the processor 1101 modulates, by using the first modulation scheme, the signaling carried in the control channel specifically includes:

classifying the signaling of the UE and the system message signaling into two groups, where in the two groups, one group A includes the signaling of the UE, and the other group B includes the system message signaling, for the group A, the base station performs an N point DFT on signaling in the group A, and for the group B, the base station performs an M point DFT on signaling in the group B; and mapping, to a system resource of K points, M+N points obtained after the DFT transform performed on the group A and the DFT transform performed on the group B, and then performing a K point IFFT, so as to obtain an SC symbol corresponding to the group A and an SC symbol corresponding to the group B, where M, N, and K are positive integers, and a sum of M and N is less than or equal to K.

Optionally, when the control channel and the traffic channel are multiplexed using time division multiplexing, a time guard interval is set between the control channel and the traffic channel.

The base station in this embodiment may be configured to execute the method embodiment shown in FIG. 1B and the technical solutions on the base station side in the method embodiment shown in FIG. 3. Implementation principles and technical effects thereof are similar, and details are not described herein again.

Figure 12:
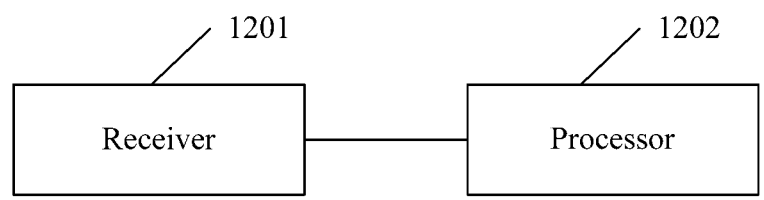
FIG. 12 is a schematic structural diagram of Embodiment 2 of a user equipment according to the present application.

FIG. 12 is a schematic structural diagram of Embodiment 2 of a user equipment according to the present application. As shown in FIG. 12, the user equipment in this embodiment may include a receiver 1201 and a processor 1202. The receiver 1201 is configured to receive a signal from a base station, where the signal is obtained after the base station modulates, by using a first modulation scheme, signaling carried in a control channel and modulates, by using a second modulation scheme, data carried in a traffic channel. The processor 1202 is configured to demodulate the signal by using a first demodulation scheme and a second demodulation scheme, so as to obtain the signaling carried in the control channel and the data carried in the traffic channel.

The control channel and the traffic channel are multiplexed using time division multiplexing, frequency division multiplexing, or space division multiplexing, the first demodulation scheme is a demodulation scheme corresponding to the first modulation scheme, and the second demodulation scheme is a demodulation scheme corresponding to the second modulation scheme.

Optionally, the control channel is ahead of the traffic channel in terms of time, header information is carried in a start time period of the control channel, and the header information includes at least one of the following information:

the first modulation scheme, the second modulation scheme, the first demodulation scheme, the second demodulation scheme, a quantity of symbols included in the control channel and a quantity of symbols included in the traffic channel.

The first demodulation scheme is a demodulation scheme corresponding to the first modulation scheme, and the second demodulation scheme is a demodulation scheme corresponding to the second modulation scheme.

Optionally, if the UE belongs to a first UE group, the header information further includes group information of the first UE group to which the UE belongs, and the group information is used to indicate a start time of a search section of the first UE group.

Optionally, the first modulation scheme is a single-carrier modulation scheme, and the second modulation scheme is an orthogonal frequency division multiplexing OFDM modulation scheme.

Optionally, the processor 1202 is further configured to use a multiple access manner of Code Division Multiple Access CDMA or Time Division Multiple Access TDMA, so as to obtain, from the signal, a signal that belongs to the UE.

That the processor 1202 demodulates the signal by using the first demodulation scheme and the second demodulation scheme specifically includes: demodulating the signal of the UE by using the first demodulation scheme and the second demodulation scheme.

Optionally, when the control channel and the traffic channel are multiplexed using time division multiplexing, a time guard interval is set between the control channel and the traffic channel.

The user equipment in this embodiment may be configured to execute the method embodiment shown in FIG. 2 and the technical solutions on the UE side in the method embodiment shown in FIG. 3. Implementation principles and technical effects thereof are similar, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A signal sending method, comprising:
modulating, by a base station by using a first modulation scheme, signaling carried in a control channel, and modulating, by using a second modulation scheme, data carried in a traffic channel, wherein the first modulation scheme is a single-carrier modulation scheme;
using, by the base station, a multiple access technique of Time Division Multiple Access (TDMA) to combine a first signal and a third signal of a user equipment (UE) and a second signal of another UE; and
sending, by the base station, a signal obtained after modulation, wherein the control channel and the traffic channel of each of the first, second and third signals are multiplexed using time division multiplexing, frequency division multiplexing, or space division multiplexing, wherein the signal sent by the base station comprises the first signal, the second signal and the third signal.

2. The method according to claim 1, wherein, in each of the first, second, and third signal:
the control channel is ahead of the traffic channel in terms of time;
header information is carried in a start time period of the control channel; and
the header information comprises at least one of the following information:
the first modulation scheme, the second modulation scheme, a first demodulation scheme, a second demodulation scheme, a quantity of symbols comprised in the control channel and a quantity of symbols comprised in the traffic channel, wherein the first demodulation scheme is a demodulation scheme corresponding to the first modulation scheme, and the second demodulation scheme is a demodulation scheme corresponding to the second modulation scheme.

3. The method according to claim 2, wherein when the UE belongs to a first UE group, the header information further comprises group information of the first UE group to which the UE belongs for indicating a start time of a search section of the first UE group.

4. The method according to claim 1, wherein the second modulation scheme is an orthogonal frequency division multiplexing (OFDM) modulation scheme.

5. A signal receiving method, comprising:
determining, by a user equipment (UE), a first demodulation scheme and a second demodulation scheme, wherein the first modulation scheme is a single-carrier modulation scheme;
receiving, by the UE, a signal from a base station;
demodulating, by the UE, the signal by using the first demodulation scheme and the second demodulation scheme to obtain signaling carried in a control channel and data carried in a traffic channel, wherein the control channel and the traffic channel are multiplexed using time division multiplexing, frequency division multiplexing, or space division multiplexing;
wherein when the signal further comprises a second signal of another UE, and before demodulating, by the UE, the signal by using the first demodulation scheme and the second demodulation scheme, the method further comprises:
using, by the UE, a multiple access manner of Time Division Multiple Access (TDMA) to obtain, from the signal and the second signal, a third signal of the UE; and
wherein demodulating, by the UE, the signal of the UE by using the first demodulation scheme and the second demodulation scheme comprises:
demodulating, by the UE, the third signal of the UE by using the first demodulation scheme and the second demodulation scheme.

6. The method according to claim 5, wherein:
the control channel is ahead of the traffic channel in terms of time;
header information is carried in a start time period of the control channel; and
the header information comprises at least one of the following information:
a first modulation scheme, a second modulation scheme, the first demodulation scheme, the second demodulation scheme, a quantity of symbols comprised in the control channel and a quantity of symbols comprised in the traffic channel, wherein the first demodulation scheme is a demodulation scheme corresponding to the first modulation scheme, and the second demodulation scheme is a demodulation scheme corresponding to the second modulation scheme.

7. The method according to claim 6, wherein when the UE belongs to a first UE group, the header information further comprises group information of the first UE group to which the UE belongs for indicating a start time of a search section of the first UE group.

8. The method according to claim 5, wherein the second modulation scheme is an orthogonal frequency division multiplexing (OFDM) modulation scheme.

9. A device, comprising:
a processor; and
a storage medium coupled to the processor and for storing programming instructions which, when executed by the processor, cause the device to:
modulate, by using a first modulation scheme, signaling carried in a control channel, and modulate, by using a second modulation scheme, data carried in a traffic channel, wherein the first modulation scheme is a single-carrier modulation scheme,
use a multiple access technique of Time Division Multiple Access (TDMA) to combine a first signal and a third signal of a user equipment (UE) and a second signal of another UE, and send a signal obtained after modulation, wherein the control channel and the traffic channel of each of the first, second, and third signals are multiplexed using time division multiplexing, frequency division multiplexing, or space division multiplexing, and wherein the signal comprises the first signal, the second signal, and the third signal.

10. The device according to claim 9, wherein, in each of the first, second, and third signal:
the control channel is ahead of the traffic channel in terms of time;
header information is carried in a start time period of the control channel; and
the header information comprises at least one of the following information:
the first modulation scheme, the second modulation scheme, a first demodulation scheme, a second demodulation scheme, a quantity of symbols comprised in the control channel and a quantity of symbols comprised in the traffic channel, wherein the first demodulation scheme is a demodulation scheme corresponding to the first modulation scheme, and the second demodulation scheme is a demodulation scheme corresponding to the second modulation scheme.

11. The base station according to claim 10, wherein when the UE belongs to a first UE group, the header information further comprises group information of the first UE group to which the UE belongs for indicating a start time of a search section of the first UE group.

12. The base station according to claim 9, wherein the second modulation scheme is an orthogonal frequency division multiplexing (OFDM) modulation scheme.

13. A device, comprising:
a processor; and
a storage medium coupled to the processor and for storing programming instructions which, when executed by the processor, cause the device to:
determine a first demodulation scheme and a second demodulation scheme, wherein the first modulation scheme is a single-carrier modulation scheme,
receive a signal from a base station,
demodulate the signal by using the first demodulation scheme and the second demodulation scheme to obtain signaling carried in a control channel and data carried in a traffic channel, wherein the control channel and the traffic channel are multiplexed using time division multiplexing, frequency division multiplexing, or space division multiplexing,
wherein when the signal further comprises a second signal of another UE, and before demodulating the signal by using the first demodulation scheme and the second demodulation scheme, the programming instructions, when executed by the processor, cause the device to:
use a multiple access manner of Time Division Multiple Access (TDMA) to obtain, from the signal and the second signal, a third signal, and
wherein to demodulate the signal, the programming instructions, when executed by the processor, cause the device to demodulate the third signal by using the first demodulation scheme and the second demodulation scheme.

14. The device according to claim 13, wherein:
the control channel is ahead of the traffic channel in terms of time;
header information is carried in a start time period of the control channel; and
the header information comprises at least one of the following information:
a first modulation scheme, a second modulation scheme, the first demodulation scheme, the second demodulation scheme, and a quantity of symbols comprised in the control channel and a quantity of symbols comprised in the traffic channel, wherein the first demodulation scheme is a demodulation scheme corresponding to the first modulation scheme, and the second demodulation scheme is a demodulation scheme corresponding to the second modulation scheme.

15. The device according to claim 14, wherein when the device belongs to a first user equipment (UE) group, the header information further comprises group information of the first UE group to which the UE belongs for indicating a start time of a search section of the first UE group.

16. The device according to claim 13, wherein the second modulation scheme is an orthogonal frequency division multiplexing (OFDM) modulation scheme.

\* \* \* \* \*

UNITED STATES PATENT AND TRADEMARK OFFICE
CERTIFICATE OF CORRECTION

PATENT NO. : 10,651,966 B2
APPLICATION NO. : 15/966428
DATED : May 12, 2020
INVENTOR(S) : Kunpeng Liu and Qiang Li Page 1 of 1

It is certified that error appears in the above-identified patent and that said Letters Patent is hereby corrected as shown below:

On the Title Page

In (73) Assignee, delete "Huawei Technologies, Co., Inc." and insert --Huawei Technologies CO., LTD.-- therefore Signed and Sealed this
Eighteenth Day of August, 2020

Andrei Iancu
*Director of the United States Patent and Trademark Office*